United States Patent [19]
Okayama et al.

[11] Patent Number: 5,163,106
[45] Date of Patent: Nov. 10, 1992

[54] WAVEGUIDE-TYPE OPTICAL SWITCH

[75] Inventors: Hideaki Okayama; Issei Asabayashi, both of Tokyo, Japan

[73] Assignee: Oki Electric Industry Co., Tokyo, Japan

[21] Appl. No.: 763,196

[22] Filed: Sep. 20, 1991

[30] Foreign Application Priority Data

Sep. 20, 1990 [JP] Japan ................... 2-251515

[51] Int. Cl.$^5$ ............................................. G02B 6/26
[52] U.S. Cl. ................................... 385/45; 385/40
[58] Field of Search ............... 385/15, 39, 45, 40

[56] References Cited

U.S. PATENT DOCUMENTS

| | | | |
|---|---|---|---|
| 4,165,225 | 8/1979 | Auracher et al. | 385/39 |
| 4,652,076 | 3/1987 | Unger | 385/39 |
| 4,820,009 | 4/1989 | Thaniyavarn | 385/45 |

OTHER PUBLICATIONS

Thylen et al., "Theoretical and Experimental Investigations of 1×2 Digital Switches," 15th European Conference on Optical Communication (ECOC '89) vol. 1, 10–14, Sep. 1989, pp. 240–243.

Sawa et al., "Design Considerations for Mode-Conversion Type Optical Branching Waveguides", Electronics and Communications in Japan:Part II, vol. 72, No. 2, Feb. 1989, pp. 65–77.

*Primary Examiner*—John D. Lee
*Assistant Examiner*—S. W. Barns
*Attorney, Agent, or Firm*—Edward D. Manzo

[57] ABSTRACT

A waveguide-type optical switch having a Y-branch structure composed of a Y-waveguide and branched waveguides provided with electrodes for electrically controlling the guide asynchronism thereof characterized in that the branched waveguides arranged at a converging angle of $\theta_1$, and the Y-waveguide having a branching angle $\theta_2$ ($\theta_2 > \theta_1$) connected to the branched waveguides. It is possible to shorten the length of the device of the Y-structured arrangement having the electrodes capable electrically of controlling the asynchronism of the branched waveguides.

19 Claims, 9 Drawing Sheets

WAVEGUIDE-TYPE OPTICAL SWITCH

BACKGROUND OF THE INVENTION

1. Field of the Invention

The present invention relates to a waveguide-type optical switch for controlling a propagating direction of the light which is transmitted in a waveguide.

2. Description of the Related Art

There has been known a Y-branch structured waveguide-type optical switch as one of main devices for constituting an optical integrated circuit. The Y-branch structured waveguide-type optical switch was disclosed in the literature (a) entitled "Electronic Communication Society Technical Research Report OQE 83–87" in which the waveguide-type optical switch comprises electrodes for electrically asynchronously controlling a guide of each branched waveguide.

This waveguide-type optical switch will be described more in detail with reference to FIG. 9.

The waveguide-type optical switch comprises a substrate 11 formed of $LiN_bO_3$ having an coupling region on the surface C thereof, a waveguide 13, branched waveguides 15a and 15b branched from the waveguide 13 at a branching angle $\theta$ and electrodes 17 (hatched portion in FIG. 9) having a portion provided at the coupling region having a length l between the branching point P and the portion where the coupling intensity of the branched waveguides is sufficiently weakened. The electrodes 17 control a refractive index in the branched waveguides 15a and 15b.

The waveguide-type optical switch is characterized in that an ON-OFF digital operation is performed utilizing an optical power of the even mode which is concentrated at the branched waveguide 15a or 15b where the refractive index is enhanced without utilizing an interference effect. The waveguide-type optical switch is also characterized in sufficient tolerance for a fabrication condition and an operation condition.

However, if the drive voltage is suppressed to a low value according to the conventional waveguide-type optical switch, the branching angle $\theta$ should be small as disclosed in the literature (a). Accordingly, the length l of the electrode (refer to FIG. 9) where the coupling intensity of both the branched waveguides is effectively retained is naturally lengthened which generated the problem in that the entire length of the device (entire length of l in FIG. 9 (horizontal length)) is lengthened.

SUMMARY OF THE INVENTION

The present invention has been made in view of the problem of the conventional waveguide-type optical device and is to provide a waveguide-type optical switch capable of shortening the entire length thereof and having a Y-branch structure composed of a Y-waveguide and branched waveguides provided with electrodes for electrically controlling the guide asynchronously thereof.

In FIG. 1, for example, regions I and II are shown. Region I divides the light power of an inputted light. Region II controls the light field therein by adjusting the voltage applied on an electrode to improve the crosstalk characteristics. An important object of the present invention, as illustrated in FIG. 1, is to shorten the region I by optimizing a branching angle $\theta$ whereby a small sized waveguide optical switch can be realized without degrading the crosstalk characteristics. Further, if the branches in region II are straight, an optical switch can be easily designed using CAD (computer aided design).

To achieve the above object, the waveguide-type optical switch according to the present invention comprises a waveguide-type optical switch having a Y-branch structure composed of a Y-waveguide and branched waveguides provided with electrodes for electrically controlling the guide asynchronism thereof characterized in that the branched waveguides arranged at a converging angle of $\theta_1$, and the Y-waveguide having a branching angle $\theta_2$ ($\theta_2 > \theta_1$) connected to the branched waveguides.

The converging angle $\theta_1$ is an angle defined by extending the lines of the branched waveguides, if linear, in the tapered direction until they cross each other (refer to FIG. 1). The converging angle $\theta_1$ is an angle defined by crossing the tangential lines of the branched waveguides, when the branched waveguides have curvatures, at the portion where the branched waveguides are connected to the Y-waveguide (refer to FIG. 8(A)).

It is preferable in embodying the present invention that the branched waveguides are disposed at the location wherein the branched waveguides are arranged at the location satisfying the expression for $0.003 < R < 0.3$, where R is a guide coupling coefficient ratio of Ke to Ko, i.e. $R = Ke/Ko$, where Ke is a coupling coefficient of the branched waveguides at the location where the branched waveguides are terminated and Ko is a coupling coefficient of the branched waveguides at the location where the branched waveguides are connected to the Y-waveguide.

DESCRIPTION OF THE PREFERRED EMBODIMENT

Figure 1:
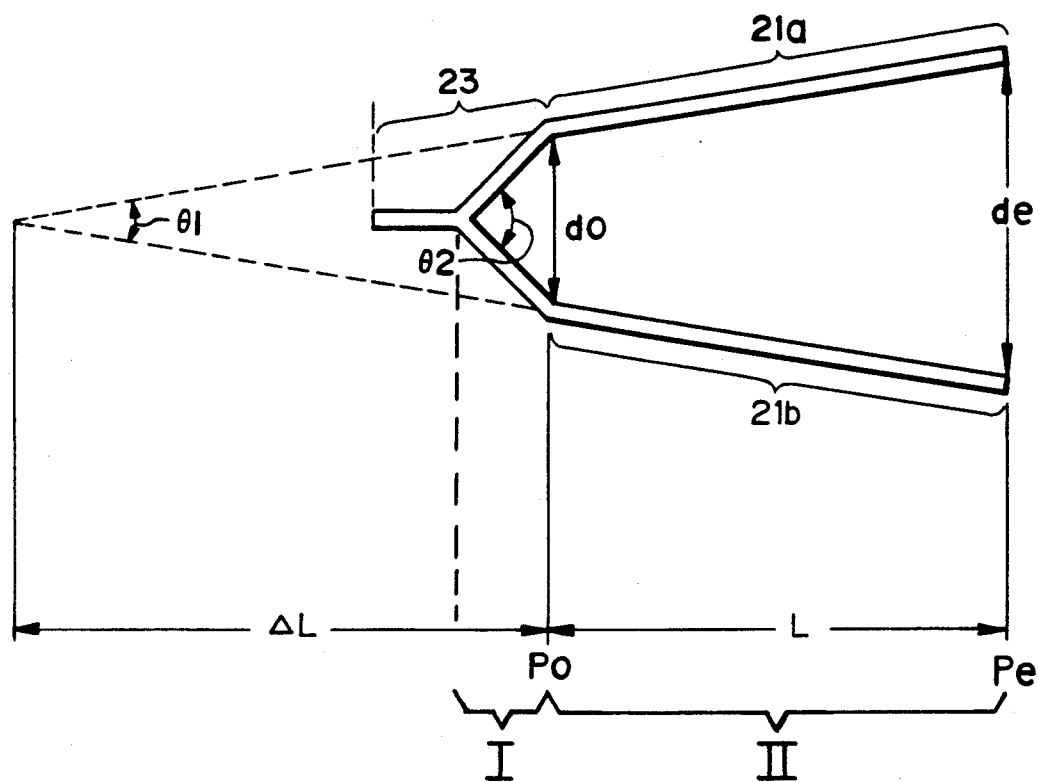
FIG. 1 is a schematic view showing a basic structure of a waveguide-type optical switch according to the present invention.

FIG. 1 is a perspective view showing a general structure of the waveguide-type optical switch according to the present invention.

The waveguide-type optical switch according to the present invention comprises two branched waveguides 21a and 21b having a converging angle $\theta_1$ between them (defined at the extensions thereof) and electrodes, not shown. The branched waveguides 21a and 21b have a first interval or separation $d_o$ defined therebetween at the starting end thereof and a second interval $d_e$ or separation defined therebetween at the terminating end thereof. The branched waveguides 21a and 21b are connected to a Y-waveguide 23 which has a branching angle $\theta_2$, where the branching angle $\theta_2$ is greater than the converging angle $\theta_1$ thereby forming the waveguide-type optical switch. The waveguide-type optical switch of the present invention is equal to the one which is formed by connecting the latter half portion in FIG. 9 of the branched waveguides of the conventional waveguide-type optical switch to the Y-waveguide of the present invention and deleting the portion $\Delta L$ in FIG. 1. The entire length of the waveguide-type optical switch can be shortened for the interval eliminating the length L.

Even in such an arrangement, a low drive voltage can be obtained in the same way as the conventional one by properly selecting the location of the disposition of the branched waveguides. The proper disposing locations of both the branched waveguides can be determined by satisfying the expression for $0.003 < R < 0.3$ where R is the guide coupling coefficient ratio of Ke to Ko, $R = Ke/Ko$, where Ke the coupling coefficient of the branched waveguides at the location where the branched waveguides terminate and Ko is the coupling coefficient of the branched waveguides at the location where the branched waveguides are connected to the Y-waveguide.

Figure 2:
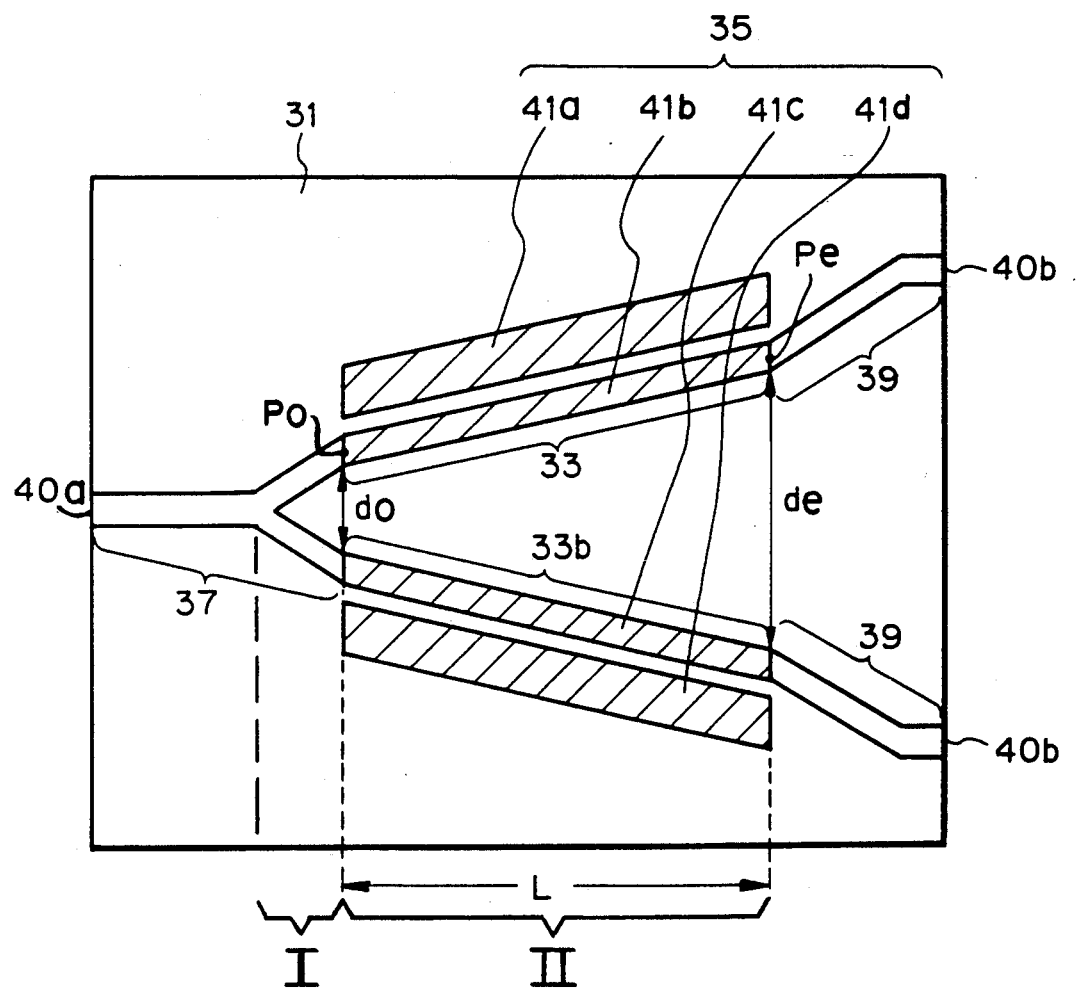
FIGS. 2 to 5 are horizontal cross-sectional of views waveguide-type optical switches showing the preferred placement of the electrodes (hatched in the drawings) over the waveguide-type optical switch according to first to fourth embodiments of the present invention.

First Embodiment (FIG. 2)

The waveguide-type optical switch according to the first embodiment of the present invention will be described with reference to FIG. 2.

A first waveguide 33a and a second waveguide 33b are respectively disposed on a substrate 31 with a converging angle $\theta_1$ (refer to FIG. 1) therebetween. The interval or separation between the first and second waveguides 33a and 33b is $d_o$ at the starting end $P_o$ of the first and second waveguides 33a and 33b and $d_e$ at the terminating end thereof where $d_o < d_e$.

The waveguide-type optical switch comprises the first and second waveguides 33a and 33b, with a Y-waveguide 37 having a branching angle $\theta_2$ (where $\theta_2 > \theta_1$) and connected to the first and second waveguides 33a and 33b at the starting end thereof (refer to FIG. 2). Electrodes 35 (hatched portion in FIG. 2) are provided for varing refractive index and propagation coefficient in the first and second branched waveguides for generating guide asynchronism between the first and second branched waveguides 33a and 33b. Also, output ports 40 and waveguides 39 connect the branched waveguides and the output ports 40.

The substrate 31 preferably employed is the one having a large electrooptic effect relative to the electric field in the thickness direction of the substrate. Illustratively, substrate 31 comprises $LiNbO_3$.

The branched waveguides 33a and 33b, the Y-waveguide 37, the waveguide 39 and the electrodes 35 are respectively fabricated by conventional technique.

The electrodes 35 comprise a first, second, third and fourth electrodes 41a, b, c, and d. First electrode 41a is disposed beside the first branched waveguide 33a which side opposite to the second branched waveguide 33b. Second electrode 41b is disposed on the first branched waveguide 33a. Third electrode 41c is disposed on the second waveguide 33b. Fourth electrode 41d is disposed along the side of the second branched waveguide 33b which side is opposite to the first branched waveguide 33a.

Figure 3:
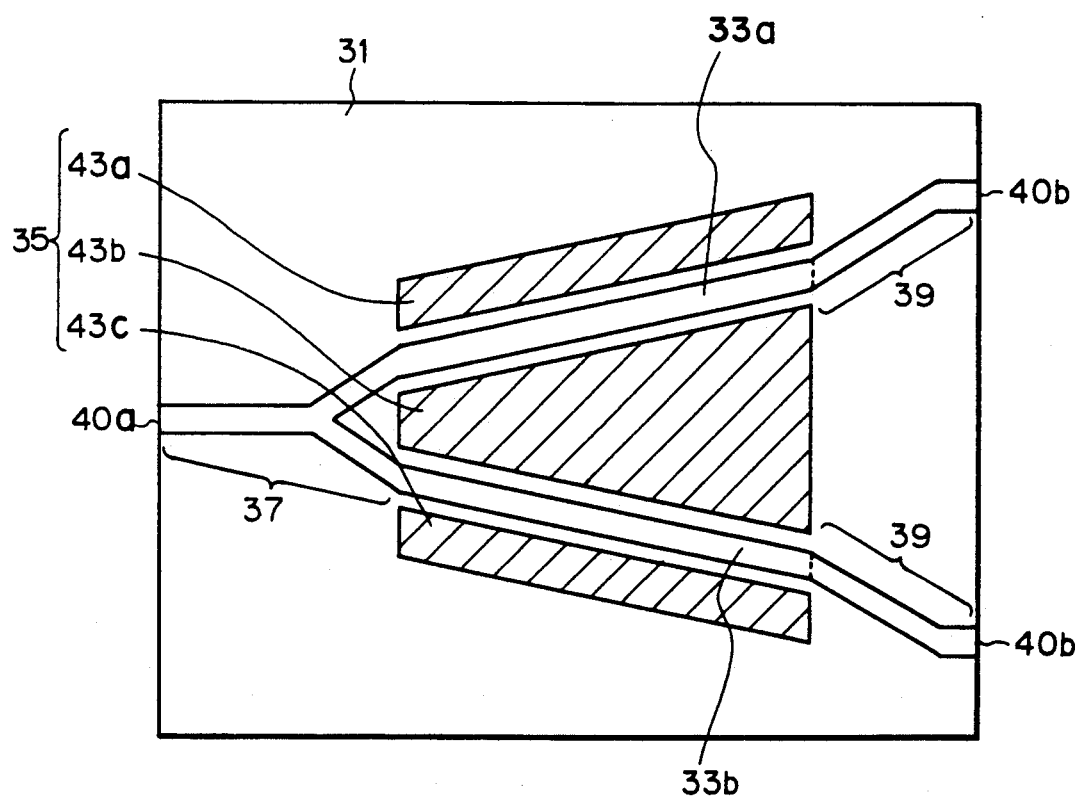
Figure 4:
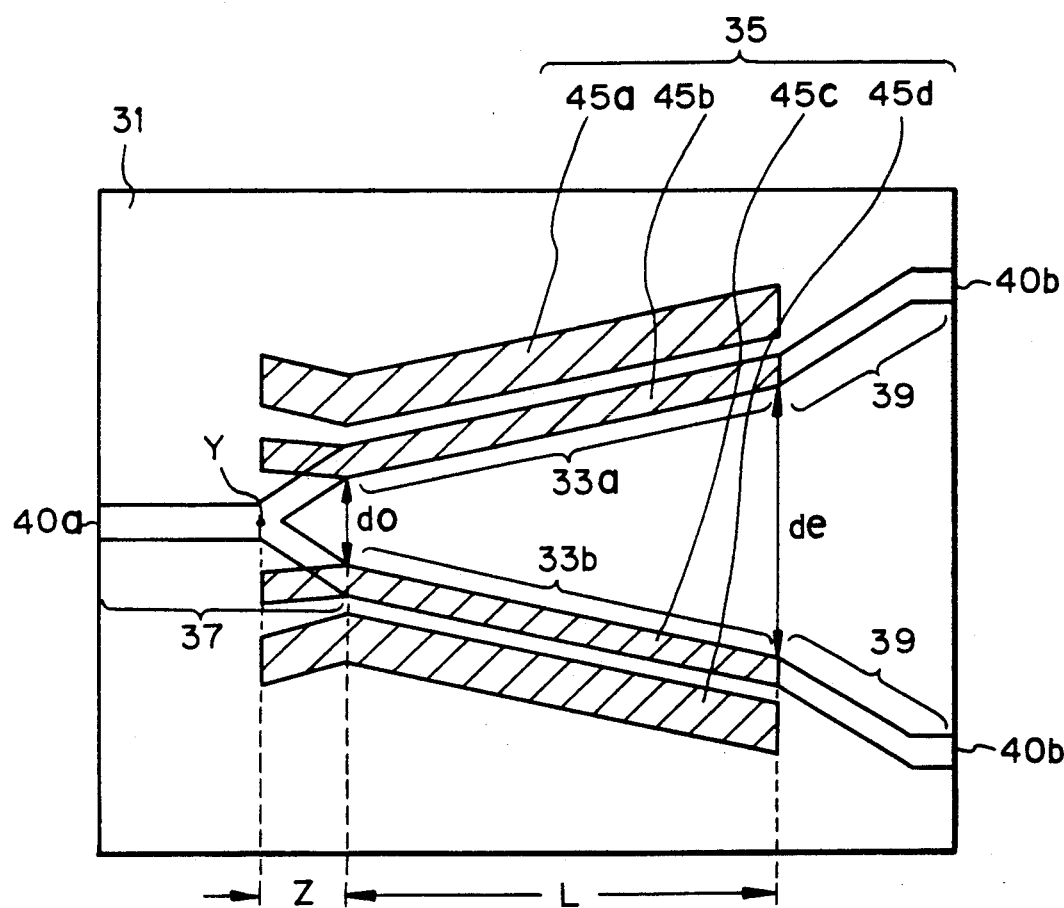
Figure 5:
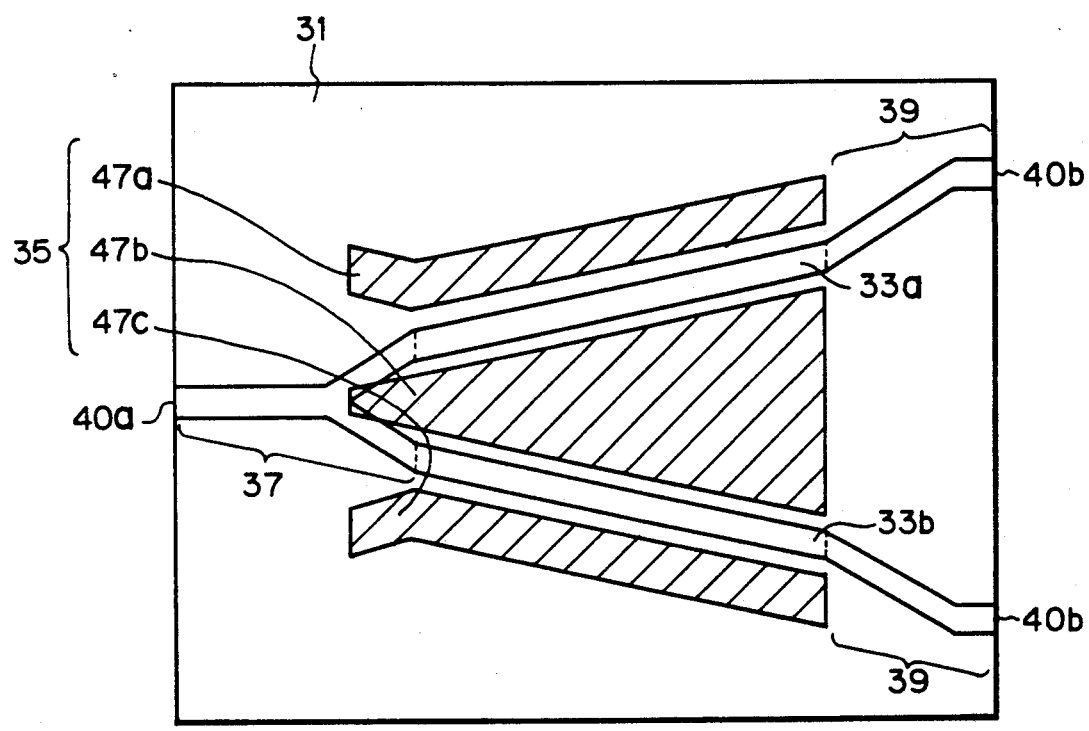

The second to fourth embodiments of the present invention as illustrated in FIGS. 3 to 5 and explained hereafter have the same structures of the waveguides as the first embodiment but different in the disposition of the electrodes for controlling the electric field in the direction perpendicular to the thickness direction of the substrate 31. Accordingly, only the disposition of the electrodes 35 will be described in the second to fourth embodiments.

Second Embodiment (FIG. 3)

The electrode 35 according to the second embodiment comprises a first electrode 43a disposed along the side of the first branched waveguide 33a which side is opposite to the second branched waveguide 33b. A second electrode 43b is disposed between the first and second branched waveguides 33a and 33b. A third electrode 43c disposed along the side of the second branched waveguide 33b which side is opposite to the first branched waveguide 33a as shown in FIG. 3. The electric field which results is parallel to the substrate 31 according to the second embodiment.

The waveguide-type optical switches according to the first and second embodiments are preferably adapted when the refractive index is forced to vary sharply at the location where the first and second branched waveguides 33a and 33b are connected to the Y-waveguide 37.

Third Embodiment (FIG. 4)

The electrode 35 according to the third embodiment comprises a first electrode 45a disposed along the side of the first branched waveguide 33a, which side is opposite to the second branched waveguide 33b so as to extend to the side of the Y-waveguide 37, a second electrode 45b disposed on the first branched waveguide so as to extend to the side of the Y-waveguide 37, a third electrode 45c disposed on the second waveguide 33b so as to extend to the side of the Y-waveguide 37 as shown in FIG. 4, and a fourth electrode 45 along the side of the second branched waveguide 33b which sides are opposite to the first branched waveguide 33a so as to extend to the side of the Y-waveguide 37.

Fourth Embodiment (FIG. 5)

The electrode 35 according to the fourth embodiment comprises a first electrode 47a disposed along the side of the first branched waveguide 33a which sides are opposite to the second branched waveguide 33b so as to extend to the side of the Y-waveguide 37, a second electrode 47b disposed between the first and second branched waveguides 33a and 33b so as to extend the side of the Y-waveguide 37 and a third electrode 47c disposed along the side of the second branched waveguide 33b which sides are opposite to the first branched waveguide 33da so as to extend to the side of the Y-waveguide 37 as shown in FIG. 5.

The waveguide-type optical switches according to the third and fourth embodiments as illustrated in FIGS. 4 and 5 are preferably adapted when the refractive index is forced to vary gently at the location extending from the Y-waveguide 37 to the branched waveguides 33a and 33b since the electrodes 35 extends to the side of the Y-waveguide 37.

Designing of the Device:

In the waveguide-type optical switch having the electrodes for controlling the guide asynchronism of the branched waveguides, an optic field is concentrated at one of the branched waveguides where a value $X_e$ is sufficiently large at the terminating end $P_e$ of the first branched waveguide 33a or the second branched waveguide 33b as shown in FIG. 2, wherein $X_e$ is expressed in the following equation (1);

$$X_e = \Delta\beta/2K_e \tag{1}$$

This is disclosed in and well known by a literature (b) entitled "Guide Wave Optoelectronics", chapter 3, published by Springer Inc. in 1988. In equation (1), $K_e$ is the coupling coefficient of the branched waveguides 33a and 33b at the terminating end thereof and $\Delta\beta$ (guide asynchronism) is a difference between the propagation coefficient of the first branched waveguide 33a and that of the second branched waveguide 33b which has an amount proportional to the input voltage applied to the electrodes 35. "The value $X_e$ is sufficiently large as referred to above" means that the value $X_e$ needs to be greater than the value given in the following equation (2) which is cited in the literature (b):

$$2X_e = X_t^{-\frac{1}{2}} \tag{2}$$

where $X_t$ is an amount of a crosstalk tolerable between the first and second branched waveguides 33a and 33b.

Accordingly, it is evident from equation (1) that the coupling coefficient of the branched waveguides at the terminating end thereof needs to be small in order to make the value $X_e$ large while the propagation coefficient variation $\Delta\beta$ is kept small, namely, the applied voltage to the electrodes 35 is kept small since the propagation coefficient variation $\Delta\beta$ is proportional to the applied voltage. However, the lower limit of the propagation coefficient variation $\Delta\beta$ should be paid attention since the crosstalk $X_t$ becomes large from the equations (1) and (2) if the propagation coefficient variation $\Delta\beta$ is made small.

The relation between the coupling coefficient $K_e$ and the interval or separation $d_e$ between the branched waveguides 33a and 33b at the terminating end $P_e$ of the branched waveguides is expressed in the following expression (3):

$$d_e = -\ln(K_e/K_1)/\gamma_3 \tag{3}$$

wherein $K_1$ is a constant and $\gamma_3$ is a transverse momentum component of the optic field in the region between waveguides.

Figure 9:
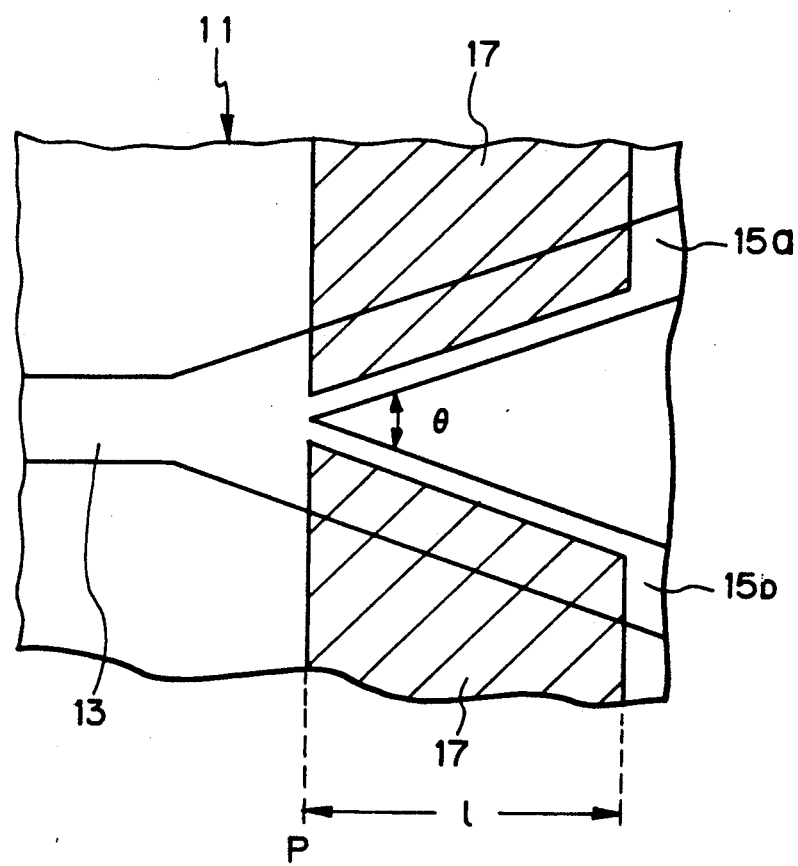
FIG. 9 is a horizontal cross-sectional view of a conventional waveguide-type optical switch showing the placement of the electrodes (hatched in the drawing) over the waveguide-type optical switch.

It is known that the crosstalk property is liable to deteriorate in this type of switch when a mode is converted (conversion from the first order local normal mode to the second order local normal mode). The peak value $\gamma$ of the index representing likelihood of the mode conversion is expressed in the following equation (4) (cited by the literature (b)):

$$\gamma = \frac{\gamma_3}{\Delta\beta} \cdot \frac{\theta_1}{\sqrt{27}} \tag{4}$$

where $\theta_1$ corresponds to the branching angle $\theta$ of the branched waveguides 15a and 15b according to the conventional waveguide-type optical switch as illustrated in FIG. 9 while it corresponds to the converging angle $\theta_1$ of the branched waveguides 33a and 33b according to the present waveguide-type optical switch (refer to FIG. 1).

It is evident from equation (4) that the mode conversion is not liable to occur if both the converging angle $\theta_1$ in the conventional optical switch and the converging angle $\theta_1$ in the present optical switch are small.

However, in the arrangement of the conventional waveguide-type optical switch, as explained with reference to FIG. 9, the lengths of the electrodes should be made long when the branching angle is small which generates the problem that the entire length of the device is made long. On the contrary, in the arrangement of the present waveguide-type optical switch, as explained with reference to FIG. 1, the entire length of the device is made short since the Y-waveguide 37 having the branching angle $\theta_2$ ($\theta_2 > \theta_1$) is connected to the branched waveguides 33a and 33b which are disposed in the converging angle $\theta_1$, and separated for the interval $d_0$ at the starting end $P_0$.

The separation between the branched waveguides, i.e. the interval $d_0$, and especially how to determine the interval $d_0$ will be described hereinafter.

The mode conversion occurs also due to the sudden occurrence of the propagation coefficient variation $\Delta\beta$ in the propagating direction of the light at the starting end $P_0$ of the branched waveguide 33a and 33b. The amount of power involved in the mode conversion at the starting end $P_0$ becomes $X_0^2/4$ in the following equation (5) assuming that $X_0$ is given as the parameter thereof based on the literature (b):

$$X_0 = \Delta\beta/2K_0 \tag{5}$$

where $K_0$ is a coupling coefficient of the branched waveguide 33a and 33b at the starting end $P_0$ thereof, i.e. at the location where the Y-waveguide is connected to the branched waveguides.

From equation (5), if the propagation coefficient variation $\Delta\beta$ is large, the value $X_0$ is increased. As a result, it is understood that the power involved in the mode conversion is increased which results in deterioration of the crosstalk.

It is possible to obtain a practical waveguide-type optical switch having less crosstalk property if the expression $\Delta\beta'/\Delta\beta \simeq 4$ is established assuming that the propagation coefficient variation $\Delta\beta$ is the propagation coefficient variation $\Delta\beta$ satisfying the expression of the amount of crosstalk $X_t \simeq 0.032$ (crosstalk is $-15$ dB) at the terminating end $P_e$ while the propagation coefficient variation $\Delta\beta'$ is the propagation coefficient variation $\Delta\beta$ satisfying the expression of the amount of the mode conversion $X_o^2/4 \simeq 0.032$ which satisfies the amount of the crosstalk at the starting end $P_o$. That is, under this condition it is possible to obtain the practical waveguide-type optical switch having the amount of crosstalk which is substantially $-15$ dB until the voltage becomes four times larger than the minimum voltage which is applied to the optical switch for obtaining 15 dB as the amount of the crosstalk.

The substitute equation $X_t = 0.032$ for the expression (2) to obtain a result. This result is substituted for the expression (1), thereby obtaining the equation (6):

$$\Delta\beta/K_e = 5.6 \tag{6}$$

Expression (7) is established from the expression $\Delta\beta'/\Delta\beta \simeq 1$, the expression (5) and the equation $X_o^2/4 \simeq 0.032$.

$$\Delta\beta'/K_o = 4\Delta\beta/K_o \simeq 0.72 \tag{7}$$

The coupling coefficient ratio R given by the coupling coefficients:

$$R = K_e K_o \approx 0.03 \quad (8)$$

The relation between the coupling coefficient $K_o$ and the separation between the branched waveguides $d_o$ is considered to be same as the expression (3), hence the following expression is established:

$$d_o = -ln(K_o/K_1)/\gamma_3 \quad (9)$$

Accordingly, the value $d_o$ can be determined so that the coupling coefficient $K_o$ in the expression (9) satisfies the expression $K_e K_o \approx 0.030$ provided that $d_o$ is the separation at the starting end of the branched waveguides and $K_e$ is the coupling coefficient at the terminating end of the branched waveguides.

It is possible to obtain the waveguide-type optical switch having no problem practically wherein the coupling coefficient ratio $K_e K_o$, i.e. R is not limited to the expression $R \approx 0.030$ but may be the value satisfying the expression $0.003 < R < 0.03$ according to the result of the numerical calculation.

The following expression is established based on the literature (b):

$$\gamma_3 \theta_1 L = \gamma_3 (d_e - d_o) = -\ln R \quad$$

where L is the length of the branched waveguide 33a or 33b (assuming that it is the length in horizontal direction as illustrated in FIG. 2), $\theta_1$ is the branching angle of these branched waveguides, $\gamma_3$ is the traverse momentum component of the optic field in the region between waveguides, $d_o$ is the separation between the branched waveguides at the starting end thereof, $d_e$ is the separation between the branched waveguides at the terminating end thereof and R is the coefficient coupling ratio.

The expression set forth just above is expressed by $\gamma_3$ and substituted for the expression (4), the following expression is established.

$$\gamma = \frac{1}{\Delta \beta L} \cdot \frac{-\ln R}{\sqrt{27}} \quad (10)$$

It is understood from the expression 10 that the smaller the peak value $\gamma$ of the index representing likelihood of the mode conversion, the larger would be the propagation coefficient variation $\Delta \beta$. Since the value $\Delta \beta / K_e$ at the minimum switching voltage is 5.6 from the expression (6), if this is expressed by the propagation coefficient variation $\Delta \beta$ and substituted in the expression (10) and the thus substituted expression is transformed with use of the coupling coefficient ratio, $R = K_e / K_o$, it is expressed as follows.

$$\gamma = \frac{1}{5.6 K_e L} \cdot \frac{-\ln R}{\sqrt{27}} \quad (11)$$
$$= \frac{1}{5.6 R K_o L} \cdot \frac{-\ln R}{\sqrt{27}}$$

If the amount of the crosstalk is sufficiently lowered, i.e. less than $-15$ dB, the condition substantially representing $\gamma < \frac{1}{2}\sqrt{27}$ is necessitated. From this condition and the expression (11), the following expression is expressed.

$$K_o L > \frac{2(-\ln R)}{5.6 R} \quad (12)$$

This expression is expressed as follows assuming that $R \approx 0.03$.

$$K_o L > 42 \quad (13)$$

If the length L is 1 cm, the separation $d_o$ is about 1 µm and the separation $d_e$ is about 8 µm from the expression (9) so that the separations $d_o$, $d_e$ may satisfy this condition. The following expression is established in the waveguide-type optical switch according to the first to fourth embodiments which is evident from FIG. 1.

$$L + \Delta L = \frac{d_e + 2W}{\theta_1} \quad (14)$$

$$\Delta L = \frac{d_o + 2W}{\theta_1}$$

where W is a width of the waveguide and $\Delta L$ is dimensions of the length of the device of the present invention to be shortened compared with that of the conventional device.

The expression (14) is transformed as follows:

$$\frac{\Delta L}{L + \Delta L} = \frac{d_o + 2W}{d_e + 2W} \quad (15)$$

If the width $W = 7$ µm and the separation $d_o = 1$ µm and the separation $d_e = 8$ µm are substituted in the expression (15), the following expression is established:

$$\frac{\Delta L}{L + \Delta L} = \frac{15}{23} \approx 0.68 \quad (16)$$

It is evident from the expression (16) that the length of the device according to the present invention is shortened substantially by one third of the length of the conventional one.

The relation between the amount of the crosstalk and the propagation coefficient variation $\Delta \beta$ are found by solving the coupling equation provided the coupling ratio is $R = 0.03$ in the branched waveguides 33a and 33b having the width $W = 7$ µm, the separation $d_o = 1$ µm and $d_e = 8$ µm with use of the parameter $K_o L$. The result is illustrated in FIG. 6 wherein the vertical axis represents the amount of crosstalk and the lateral axis represents $\Delta \beta L / \pi$.

Figure 6:
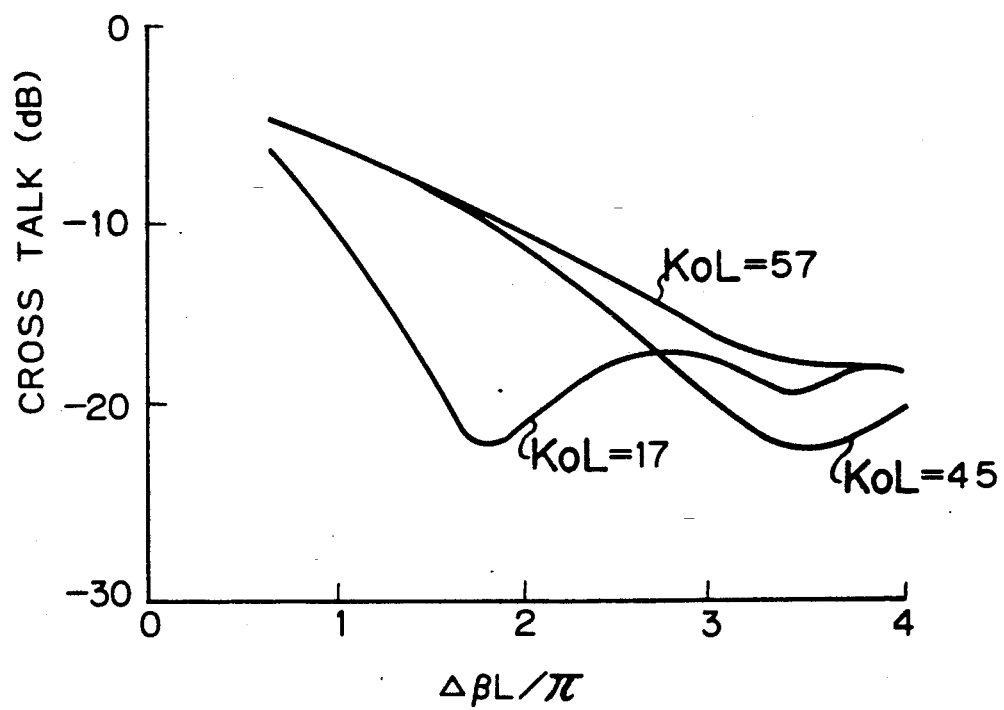
FIG. 6 is a graph showing a crosstalk property according to the present invention.

As is evident from FIG. 6, it is understood that a preferable crosstalk property can be obtained if the equation of $K_0 L = 57.45$ is established. If the inequality $K_0 L < 42$ is established, the peak value $\gamma$ representing the index of likelihood of the mode conversion becomes large. In this case, the crosstalk property ought to be deteriorated. However, there is a likelihood that the crosstalk property is improved due to the interference between the first and second local normal modes as evident from the example of the expression $K_0 L = 17$.

More in detail, $K_0$ is not a main parameter but $K_e/K_0$ is the main parameter according to the present invention.

Figure 7:
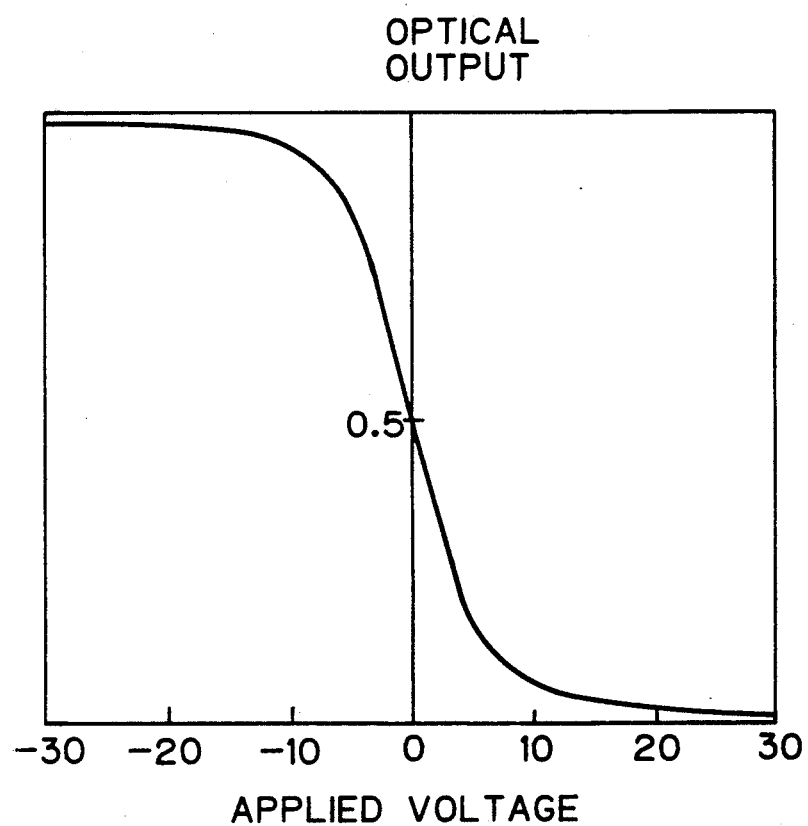
FIG. 7 is a graph showing a switching characteristic according to the present invention.

A device property which is experimentally fabricated is illustrated in FIG. 7 in which the vertical axis represents an optical output and the lateral axis represents the voltage applied to the device. The light having the wavelength 1.55 µm is used in a verification run. It is understood that the device is operated as $1 \times 2$ optical switch. The experimentally fabricated device is the same in the structure as that in FIG. 4. More in detail, it comprises a Z plate formed of LiNbO$_3$ as the substrate, the Y-waveguide 37 and the branched waveguides 33a and 33b wherein the separation d$_e$ between the branched waveguides is 8 μm at the terminating end thereof, the converging angle $\theta_1$ is 1.6 mrad, the width of the branched waveguides is 7 μm in common, the length (horizontal length) z extending from the branching point of the Y-waveguide 37 to the terminating end of the branched waveguides (refer to FIG. 4) is 2 mm and the length L of the branched waveguides is 1 cm. The waveguides are fabricated by diffusing a thin film of titanium having the thickness of 600 angstroms at the temperature of 1050° C. for eight hours. The electrode 35 is formed of a thin gold film of 2000 angstroms thick and arranged on the top surface of a SiO$_2$ layer of 3000 angstroms thick It is a routine matter, and this fabricating condition is one example.

The dimensions of the branched waveguides L+ΔL of the conventional switch becomes about 2 cm if the conventional device in FIG. 9 has the branching angle being 1.6 mrad and the separation at the terminating end d$_0$ being 8 μm. On the contrary, the length L is 1 cm according to the experimentally fabricated device which, involves a 50% reduction in length of the device over the conventional device.

Modification

The branched waveguides are linear according to the first to fourth embodiments, but they may be curved ones.

Figure 8A:
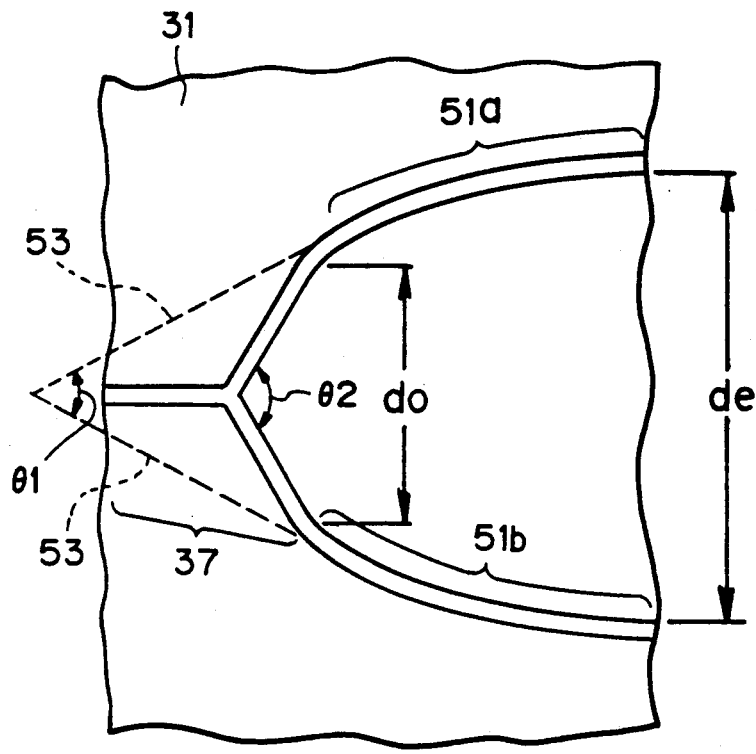
FIGS. 8A and 8B are first and second modified embodiments.
Figure 8B:
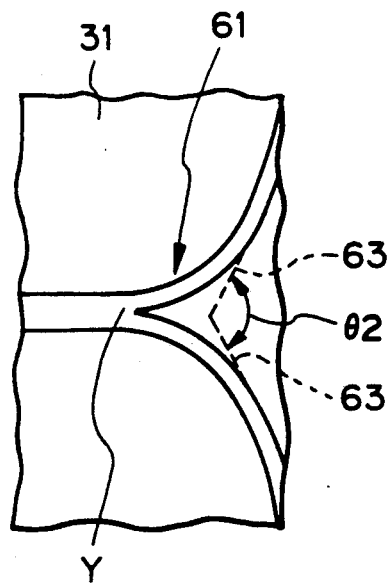

FIG. 8 (A) shows one example of the curved branched waveguides. Branched waveguides 51a and 51b provided with electrodes thereon (not shown) have the converging angle $\theta_1$, the separation d$_o$ at the starting end thereof and the separation d$_e$ at the terminating end thereof. The starting ends of the branched waveguides 51a and 51b are connected to the Y-waveguide 37 having the branching angle $\theta_2$. The branching angle $\theta_2$ is determined by extending the tangential lines 53 at the connecting portions between the Y-waveguide 37 and the branched waveguides 51a and 51b toward the Y-waveguide 37 and crossing these tangential lines 53.

The branched waveguides of the Y-waveguide may be designed to be curved. In this case, the Y-waveguide is preferable to have the converging angle $\theta_1$ as illustrated in FIG. 8 (B). More in detail, the separation between waveguides of the Y-waveguide is preferable to be exponentially increased as they are away from the branch starting end Y. The branching angle $\theta_2$ at this state is determined by the tangential lines 63 at the connecting portions between the Y-waveguide 37 and the branched waveguides 33a and 33b or between the Y-waveguide 37 and the branched waveguides 51a and 51b.

It is possible to shorten the length of the device of the Y-structured arrangement having the electrodes capable electrically of controlling the asynchronism of the branched waveguides.

What is claimed is:

1. A waveguide-type optical switch having a Y-branch structure composed of a Y-waveguide and branched waveguides provided with electrodes for electrically controlling the guide asynchronism thereof, characterized in that:
the branched waveguides are oriented along axes which converge at a converging angle $\theta_1$ ($\theta_1 > 0°$), and the Y-waveguide have a branching angle $\theta_2$ ($\theta_2 > \theta_1$) connected to the branched waveguides.

2. A switch according to claim 1 further comprising:
a plurality of other waveguides;
a plurality of output ports, said plurality of output ports being connected to said branched waveguides by said plurality of other waveguides.

3. A switch according to claim 1 further comprising a substrate, said substrate comprises LiNbO$_3$.

4. A switch according to claim 1 wherein said electrodes include a first, a second, a third and a fourth electrode, said first electrode disposed beside a one of said branched waveguides and not between said branched waveguides, said second electrode being disposed over one of said branched waveguides, said third electrode being disposed over another of said branched waveguides, and said fourth electrode being disposed beside said another of said branched waveguides and not between said branched waveguides.

5. A switch according to claim 4 wherein said branched waveguides and said electrodes each have a length L.

6. A switch according to claim 4 wherein said branched waveguides have a length L and at least one of said electrodes has an extended portion wherein a length of said at least one of said electrodes is greater than L.

7. A switch according to claim 6 wherein said extended portion has a length Z.

8. A switch according to claim 7 wherein said at least one of said electrodes is nonlinear.

9. A switch according to claim 1 wherein said electrodes comprise a first, a second and a third electrode, said first electrode being disposed between said branched waveguides, said second electrode being disposed adjacent to a one of said branched waveguides and not between said branched waveguides, and said third electrode being disposed adjacent to another of said branched waveguides and not between said branched waveguides.

10. A switch according to claim 9 wherein said branched waveguides and said electrodes have a same length.

11. A switch according to claim 9 wherein at least one of said electrodes has another length greater than a length of said branched waveguides, said another length having an extended portion.

12. A switch according to claim 11 wherein said extended portion equals a length of said Y-waveguide.

13. A switch according to claim 11 wherein said at least one of said electrodes is nonlinear.

14. A switch according to claim 1 wherein said branched waveguides are nonlinear.

15. A switch according to claim 1 wherein at least one of said branched waveguides is a titanium diffusion region.

16. A switch according to claim 1 wherein said electrodes comprises a noble metal.

17. A switch according to claim 1 further comprising an insulation film disposed between said electrodes and said branched waveguides.

18. A switch according to claim 17 wherein said insulation film is SiO$_2$ being substantially 3,000 Å thick.

19. A waveguide-type optical switch having a Y-branch structure composed of a Y-waveguide and branched waveguides provided with electrodes for electrically controlling the guide asynchronism thereof characterized in that:

the branched waveguides being oriented along axes which converge at a converging angle $\theta_1$ and disposed at a location satisfying the expression of $0.003 < R < 0.3$, where R is a guide coupling coefficient ratio of $K_3$ to $K_o$, $R = K_e/K_o$, where $K_e$ is a coupling coefficient of the branched waveguides at the location where the branched waveguides terminate and $K_o$ is a coupling coefficient of the branched waveguides at the location where the branched waveguides are connected to the Y-waveguide, said Y-waveguide having a branching angle $\theta_2$ ($\theta_2 > \theta_1$) connected to the branched waveguides.

* * * * *